United States Patent
Attucci et al.

(10) Patent No.: US 9,643,710 B2
(45) Date of Patent: May 9, 2017

(54) AUTOMATED SYSTEM FOR JOINING PORTIONS OF A CHASSIS AND METHOD THEREOF

(71) Applicant: ALENIA AERMACCHI S.P.A., Venegono Superiore (IT)

(72) Inventors: Francesco Attucci, San Vittore Olona (IT); Giuseppe Navarra, Mornago (IT); Franco Magri, Sangiano (IT); Renato Acquati, Rho (IT)

(73) Assignee: ALENIA AERMACCHI S.P.A., Venegono Superiore (VA) (IT)

( * ) Notice: Subject to any disclaimer, the term of this patent is extended or adjusted under 35 U.S.C. 154(b) by 187 days.

(21) Appl. No.: 14/377,795

(22) PCT Filed: Dec. 21, 2012

(86) PCT No.: PCT/IB2012/057627
§ 371 (c)(1),
(2) Date: Aug. 8, 2014

(87) PCT Pub. No.: WO2013/117971
PCT Pub. Date: Aug. 15, 2013

(65) Prior Publication Data
US 2015/0367930 A1    Dec. 24, 2015

(30) Foreign Application Priority Data
Feb. 9, 2012    (IT) ............................... TO2012A0111

(51) Int. Cl.
*B64F 5/00*    (2006.01)
*B64C 1/06*    (2006.01)
*B23P 19/10*    (2006.01)

(52) U.S. Cl.
CPC .............. *B64C 1/069* (2013.01); *B23P 19/10* (2013.01); *B64F 5/0009* (2013.01); *Y10T 29/49623* (2015.01); *Y10T 29/53061* (2015.01)

(58) Field of Classification Search
CPC ........ B64C 1/069; B64F 5/0009; B23P 19/10; Y10T 29/49623; Y10T 29/53061
See application file for complete search history.

(56) References Cited

U.S. PATENT DOCUMENTS 5,983,166 A * 11/1999 Matsumoto .......... G01B 11/002
                                                           33/300
8,634,950 B2 * 1/2014 Simonetti ............ G05B 19/402
                                                         700/114

FOREIGN PATENT DOCUMENTS

| CA | 2 760 720 | 11/2010 |
|----|-----------|---------|
| FR | 2 821 778 | 9/2002 |
| JP | 2006 051557 | 2/2006 |

OTHER PUBLICATIONS

International Search Report for International Application No. PCT/IB2012/057627 mailed Jul. 8, 2013 (2 pages).

* cited by examiner

*Primary Examiner* — Richard Chang
(74) *Attorney, Agent, or Firm* — Merchant & Gould P.C.

(57) ABSTRACT

An automated system for joining at least two portions of a chassis includes an actuation device (3) adapted to move at least one portion in the space "XYZ" with three degrees of freedom. A central control unit (5) controls each actuation device (3) as a function of data obtained through sensors (7). The sensors (7) can continuously determine, on each chassis portion, key points (A, B, C) which are univocal for each portion. The central control unit (5), depending on data from the sensors (7), activates the actuation device (3) to bring near and connect the at least two portions, while the sensors (Continued)

(7) monitor the relative position between the key points (A, B, C) of the portions and the absolute position of the portions in the space "XYZ". A method is associated with the automated joining system for automatically joining at least two portions to manufacture a chassis.

8 Claims, 8 Drawing Sheets

AUTOMATED SYSTEM FOR JOINING PORTIONS OF A CHASSIS AND METHOD THEREOF

This application is a National Stage Application of PCT/IB2012/057627, filed 21 Dec. 2012, which claims benefit of Serial No. TO2012A000111, filed 9 Feb. 2012 in Italy and which applications are incorporated herein by reference. To the extent appropriate, a claim of priority is made to each of the above disclosed applications.

BACKGROUND

The present invention relates to an automated system for structurally joining at least two main portions making up the chassis of a vehicle or the fuselage of an aircraft or the hull of a boat. Said system can automatically and continuously handle all the steps of the associated method for joining the portions. Said system can handle the entire kinematic/mechanic chain for manufacturing said vehicle or aircraft or boat.

The associated method of assembly concerns the steps carried out by the system for assembling chassis or fuselage or hull portions, which steps are carried out automatically and are highly reproducible.

Preferably, said system and the associated method are applicable for manufacturing aircraft fuselages by joining at least two fuselage sections.

It is known that assembling the sections of an aircraft fuselage is a very complex task that requires much control in order to create an aircraft capable of passing the flight resistance tests. In fact, if such sections are not properly assembled, the resulting aircraft will suffer stability and aerodynamics problems, which may endanger the utilization of the aircraft thus assembled.

Systems for joining at least two fuselage sections are known which comprise a plurality of sensors adapted to facilitate the steps of positioning, moving and joining said sections, which are carried out by assembly personnel. In fact, most of the steps of the methods for manufacturing an aircraft described in the prior art are carried out by human personnel with the help of electromechanical devices and sensors of various nature.

For this reason, when manufacturing an aircraft, errors may be made due to the human component while executing one or more steps of the method for assembling and joining the aircraft sections.

Automatic devices are known which are adapted to carry out one or more steps of the method for manufacturing an aircraft; said devices are supervised by an assembly operator. Therefore, in order to join sections of an aircraft, the operator will have to supervise a plurality of automatic devices. Manufacturing an aircraft in compliance with assembly standards strongly depends on the skills of the assembly operator, who is in charge of coordinating the various devices and possibly also supervising any manually executed operations.

A method of this type turns out to be very costly, because it requires the use of many electromechanical devices that must be made to interact with one another, and also because of the large number of manual operations involved. In addition, such a method is also costly in terms of production time per aircraft, because the various steps must be supervised by the person in charge, although with the help of sensors of various kinds, who must supervise every critical aspect of the aircraft production process.

Finally, this type of method, the implementation of which requires a human component, introduces an uncertain variable which makes the method hardly reproducible and which, in probabilistic terms, causes high uncertainty as to the result thereof. Such uncertainty implies increased average aircraft production costs.

It should also be underlined that each electromechanical device used for implementing the method introduces intrinsic uncertainty in the operations it is adapted to perform; such uncertainty adds up to the uncertainties of the other electromechanical devices, because the systems known in the art do not include a central control system capable of coordinating such electromechanical devices to eliminate any errors so as to reduce the uncertainty of the entire system and, as a consequence, of the manufacturing method.

Junction errors are also due to intrinsic physical factors, such as thermal or mechanical expansion of metal parts, depending on the temperature and humidity present in the place where the assembly process is being carried out.

Checks are also known to be made on the junction by means of laser measurements taken at discrete instants while executing the joining method.

However, such checks do not ensure junction repeatability and correct alignment of all of the key points required for properly joining the parts.

SUMMARY

The present invention aims at solving the above-mentioned problems by providing a system for joining at least to main portions of a chassis or an aircraft fuselage or, a boat hull, which system can automatically control and manage a plurality of actuation devices through a central control unit as a function of data obtained from a plurality of sensors.

The present invention also aims at solving the above-mentioned problems by implementing a new method for joining at least two main portions or sections in a totally automatic manner, allowing for re-alignment of all key points for the purpose of ensuring repeatability of the junction between the main portions or sections.

One aspect of the present invention relates to an automated system for joining at least two main portions of a chassis or a fuselage or a hull.

A further aspect of the present invention relates to a method for automatically joining at least two main portions or sections.

BRIEF DESCRIPTION OF THE DRAWINGS

The features and advantages of the automated system and of the associated method according to the present invention will become more apparent from the following description of at least one embodiment thereof and from the annexed drawings, wherein:

FIGS. 3A and 3B show the actuation device; in particular.

FIGS. 5A, 5B are perspective views showing the execution of steps g) and h) of the flow chart of FIG. 4, implemented by the system shown in FIGS. 1 and 2, for joining a front section of an aircraft fuselage, wherein FIG. 5A shows step g) and FIG. 5B shows step h);

DETAILED DESCRIPTION

With reference to the above-mentioned drawings, the automated system for joining at least two portions of a chassis, e.g. of a vehicle or an aircraft or a boat, comprises at least one actuation device 3, preferably at least one per portion, which is adapted to move at least one portion in the space "XYZ" with three degrees of freedom; a central control unit 5, adapted to control each actuation device 3 as a function of a plurality of data obtained through a plurality of sensors 7.

Said plurality of sensors 7 can continuously determine, on each chassis portion, a plurality of key points (A, B, C) which are univocal for each portion.

For the purposes of the present invention, the expression "measurement taken continuously" refers to a measurement taken in a continuous manner over time, during the steps of the method according to the present invention, i.e. not only at discrete instants.

Said central control unit 5, depending on the data obtained from said plurality of sensors 7, activates said at least one actuation device 3 in order to bring near and connect said portions, while monitoring, through said plurality of sensors 7, the relative position between said plurality of key points (A, B, C) of said portions, and the absolute position of said portions in space "XYZ".

Figure 1:
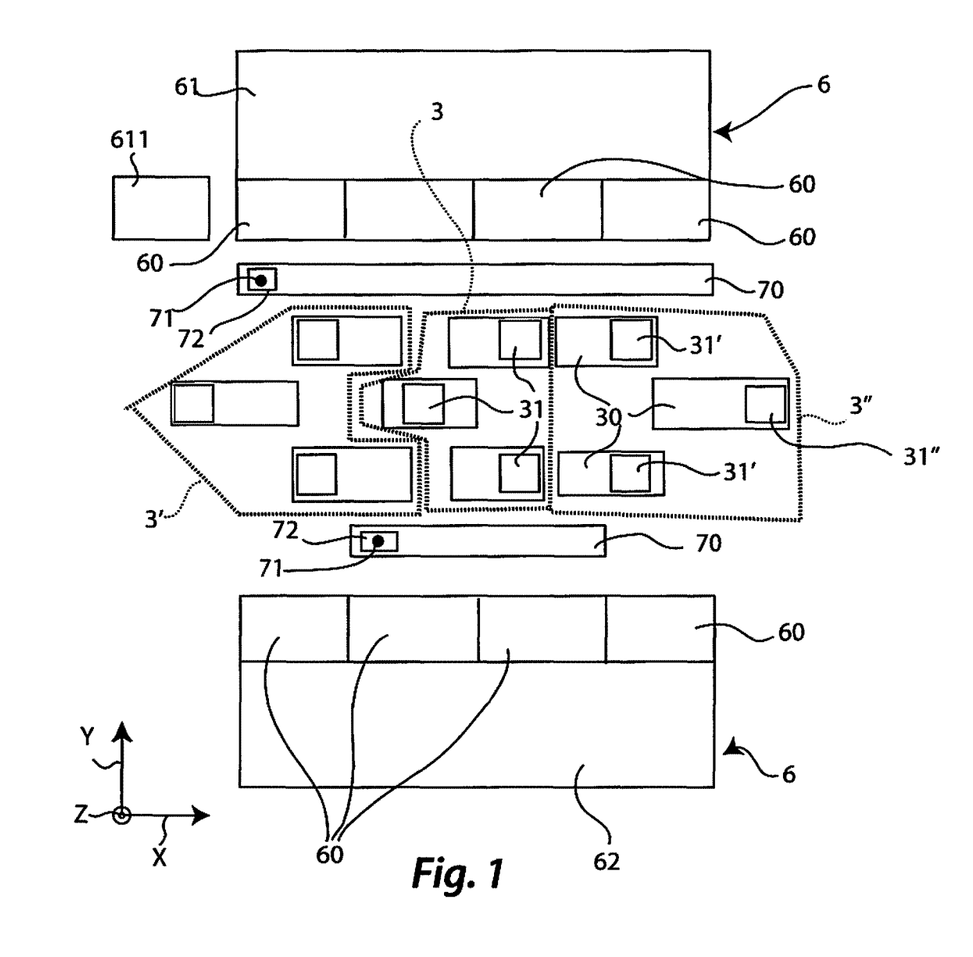
FIG. 1 is a schematic plan view of a joining system according to the present invention.
Figure 2:
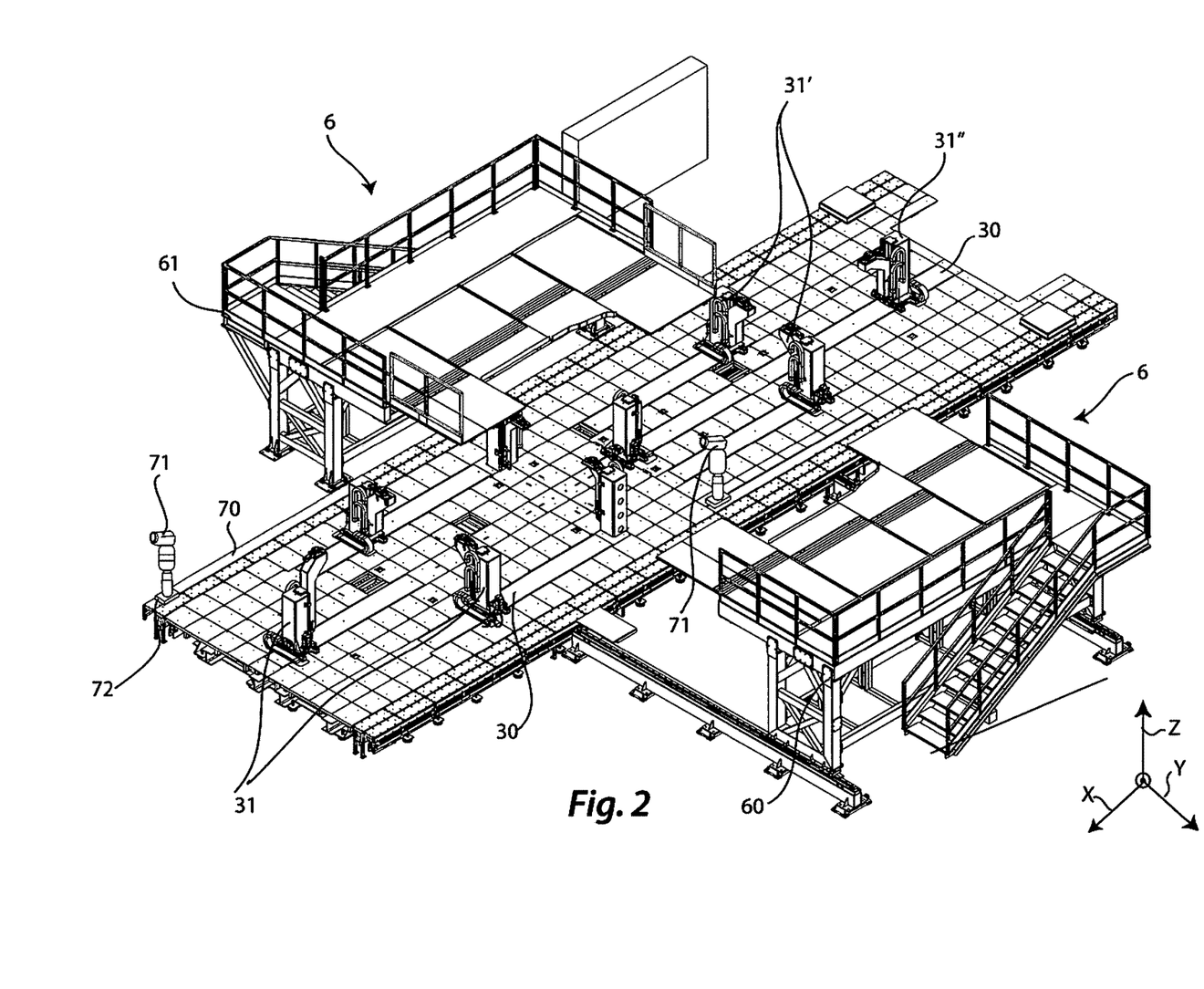
FIG. 2 is a general perspective view, of an embodiment of the joining system according to the present invention.

According to the preferred embodiment of the system, shown in FIGS. 1 and 2, the automated system is adapted to join at least two sections "T" of a fuselage of an aircraft "V" and comprises, for each section "T", at least one actuation device 3 adapted to move said sections "T" in space "XYZ" with three degrees of freedom, and a central control unit 5 adapted to control each actuation device 3 as a function of a plurality of data obtained from a plurality of sensors 7. Said plurality of sensors 7 can continuously determine said plurality of key points (A, B, C) on each section "T". Said one central control unit 5, based on the data obtained from said plurality of sensors 7, activates said at least one actuation device 3 in order to move said sections "T", e.g. to bring near and connect said sections "T". Through said plurality of sensors 7, the relative position between the plurality of key points (A, B, C) and the absolute position of said sections "T" in space (XYZ) are monitored while each section is being moved by at least one actuation device 3.

A plurality of key points (A, B, C) may be univocally associated with each section "T", which key points represent the points that must be measured and/or monitored by said plurality of sensors 7 for the purpose of allowing control unit 5 to move single sections "T" by means of said actuation devices 3. Said key points (A,B,C), appropriately monitored and processed, allow sections "T" to be properly moved and joined within aerodynamic and mechanical tolerances.

Said key points are divided into:

reference points "A", which represent section reference points which are important for the relative alignment between sections "T";

lift points "B", which represent points where a scaffold or base 2 is secured to section "T"; said scaffold or base 2 is the interface between the section and actuation device 3;

check points "C", which identify the proper position of section "T" for the joining process;

point "D", which identifies the point where said scaffold or, base 2 abuts against said actuation device 3.

Figure 3A:
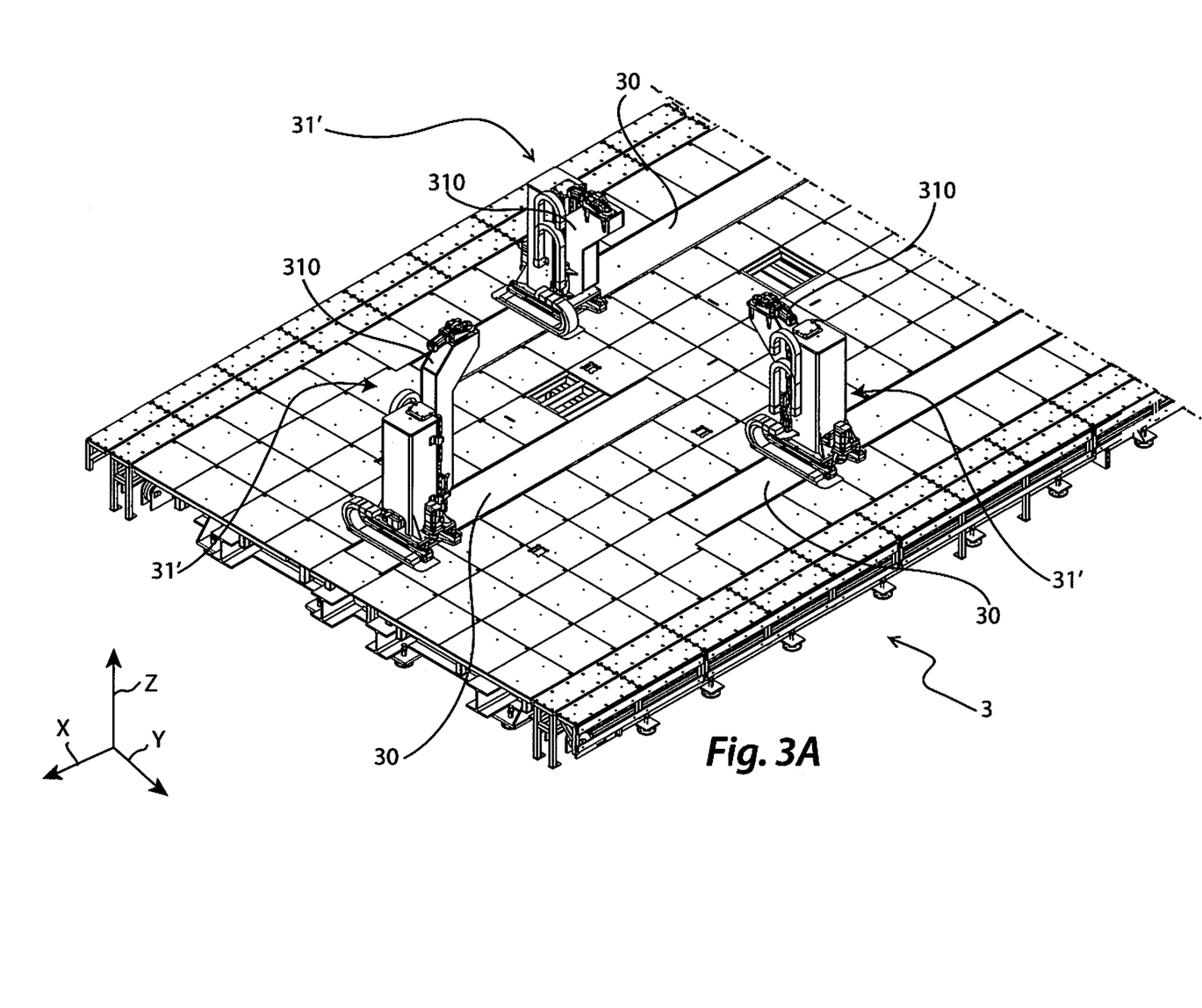
FIG. 3A shows one embodiment of an actuation device.
Figure 3B:
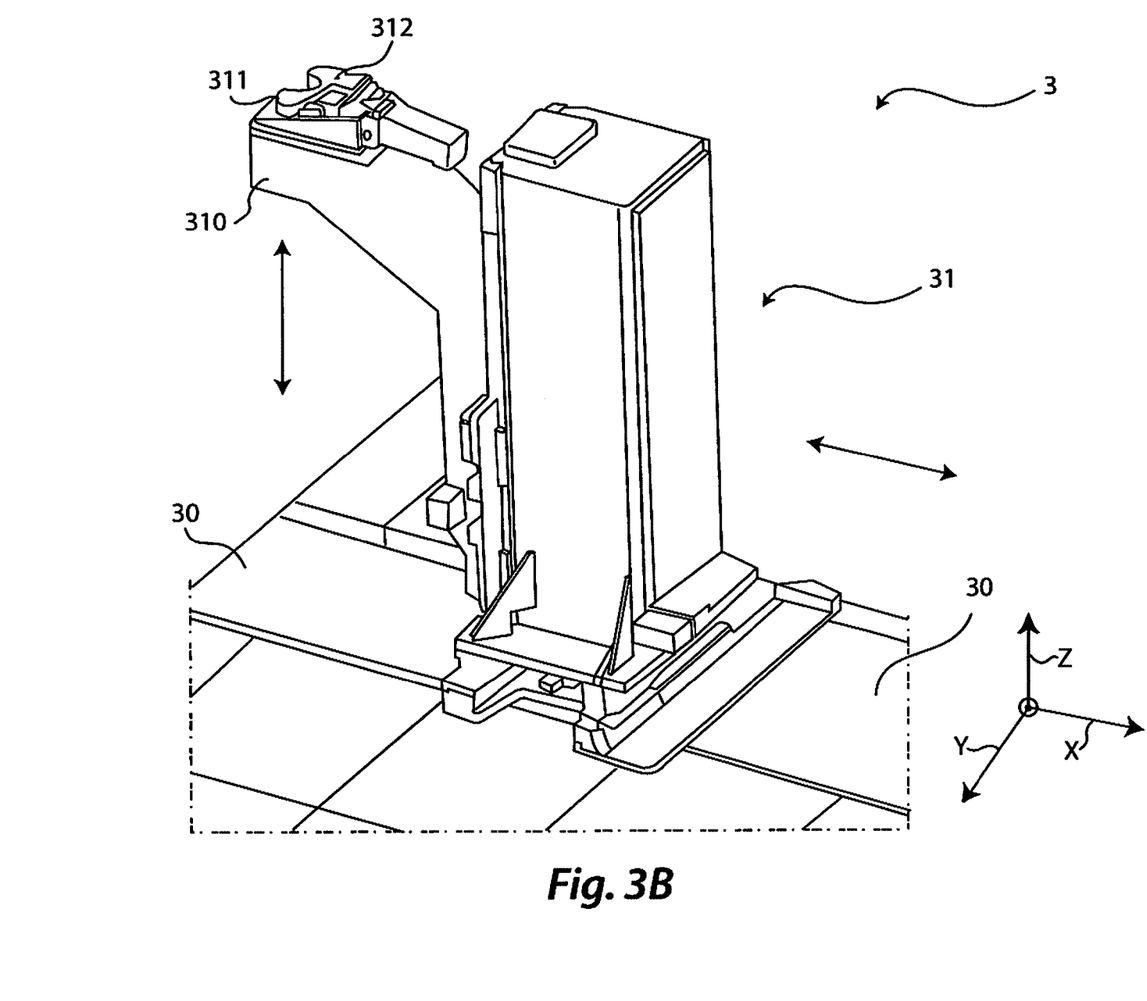
FIG. 3B shows a detail of a column.

In the embodiment shown in FIGS. 3A and 3B, each actuation device 3 comprises at least one column 31 adapted to support and move at least one fuselage section "T", so as to ensure a correct junction between sections "T". Said actuation device 3 allows moving section "T" by associating therewith different degrees of freedom, preferably three degrees of freedom. Each column 31 comprises at least one support or arm 310 adapted to support said section.

Each support 310 comprises, in turn, at least one support point 311 where point "D" of contact between scaffold or base 2 and actuation device 3 is located. Said scaffold or base 2 is in its turn secured to at least one lift point "B" of section "T", as aforementioned. Said support point 311 is preferably a housing, e.g. of hemispherical shape, adapted to house a striker positioned in point "D" of scaffold 2 and having a shape complementary to said housing. In order to secure scaffold 2 to actuation device 3, particularly to support point 311, support or arm 310 comprises at least one retaining mechanism 312 adapted to removably lock scaffold 2. Preferably, said at least one retaining element 312 is a clamp, which is moved in coordination with the movements of entire actuation device 3.

The possibility of moving said support or arm 310, through an actuator not shown in the drawings, together with the presence of at least one support point 311, allows taking up the internal torsions and strains of section "T".

Said at least one column 31 may vary the height of said support point 311 by lifting said support 310. Preferably, said support or arm 310 can be extended along a vertical axis "Z", e.g. through a guide (not shown in detail) comprised in column 31 itself. The extension of said arm 310 ensures the first degree of freedom.

In embodiments not shown in the drawings, said column 31 is telescopic or slideable, automatically, along a vertical axis "Z".

In the embodiment shown in FIGS. 1 and 2, each actuation device 3 comprises three columns 31, suitably arranged in such a way as to properly support section "T". For example, as shown in FIG. 3A, two columns are aligned along a first axis "Y" perpendicular to vertical axis "Z"; preferably, the two outer columns 31' are aligned along said first axis "Y", whereas the third column 31", interposed between said two outer columns, is offset relative to said axis "Y", e.g. located at the front along a second axis "X" perpendicular to the vertical axis "Z" and to the first axis "Y".

At least one of said columns included in actuation device 3 can move on adapted first guides 30 along said second axis "X", driven by an actuator not shown. The movement of columns 31 on the second guides 30 ensures the second degree of freedom.

Said support or base 310 is moved by means of an actuator, not shown, which is adapted to give at least the third degree of freedom to actuation device 3, e.g. through rotational or rototranslational movements of support point 311.

Preferably, each actuation device, more specifically each column 31, is moved with three degrees of freedom by means of a plurality of electric motors, each one controlled by said central control unit 5.

Said columns 31 are controlled, when moving on said guides 30 along said second axis "X", by said central control unit 5.

Said joining system according to the present invention comprises at least one platform 6 adapted to allow the operator to come close to the fuselage of aircraft "V" in order to make the junction, or to verify the quality of the work, or to check any errors reported by central control unit 5.

Each platform 6 comprises a plurality of extensible footboards 60, which are moved by means of actuators, preferably pneumatic and/or electric ones, controlled by said central control unit 5. Said plurality of footboards 60 are adapted to extend when in use, thus creating a continuous path from said platform 6 to at least one predetermined portion of the fuselage of aircraft "V". Said footboards 60 may take different positions, thus adapting themselves to the shape of the fuselage at different heights along vertical axis "Z" and to the different profiles of different aircrafts or vehicles or boats. Such footboards 60, once used, are retracted into platform 6, thus allowing the automated joining system of the present invention to proceed with the next joining steps. Such footboards 60 allow the operator to come close to the aircraft fuselage with the utmost safety.

Preferably, the system comprises a fixed platform 61, near which there is a control station 611 and a mobile platform 62, which can take an open configuration and a work configuration.

Said mobile platform 62, when in the open configuration, allows various sections "T" to pass in order to be positioned on actuation devices 3, and allows sections "T" or the entire fuselage to be removed from the actuation devices.

When in the work configuration, mobile platform 62 is close to various actuation devices 3, thus allowing the execution of the steps of the joining method according to the present invention.

Control station 611 comprises a user interface between the operator and central control unit 5, which allows issuing orders for the execution of the joining method. Said control station 611 is so positioned as to allow complete visibility of the area, thus further increasing the level of safety for the personnel, the joining method and the parts being processed.

Figure 7:
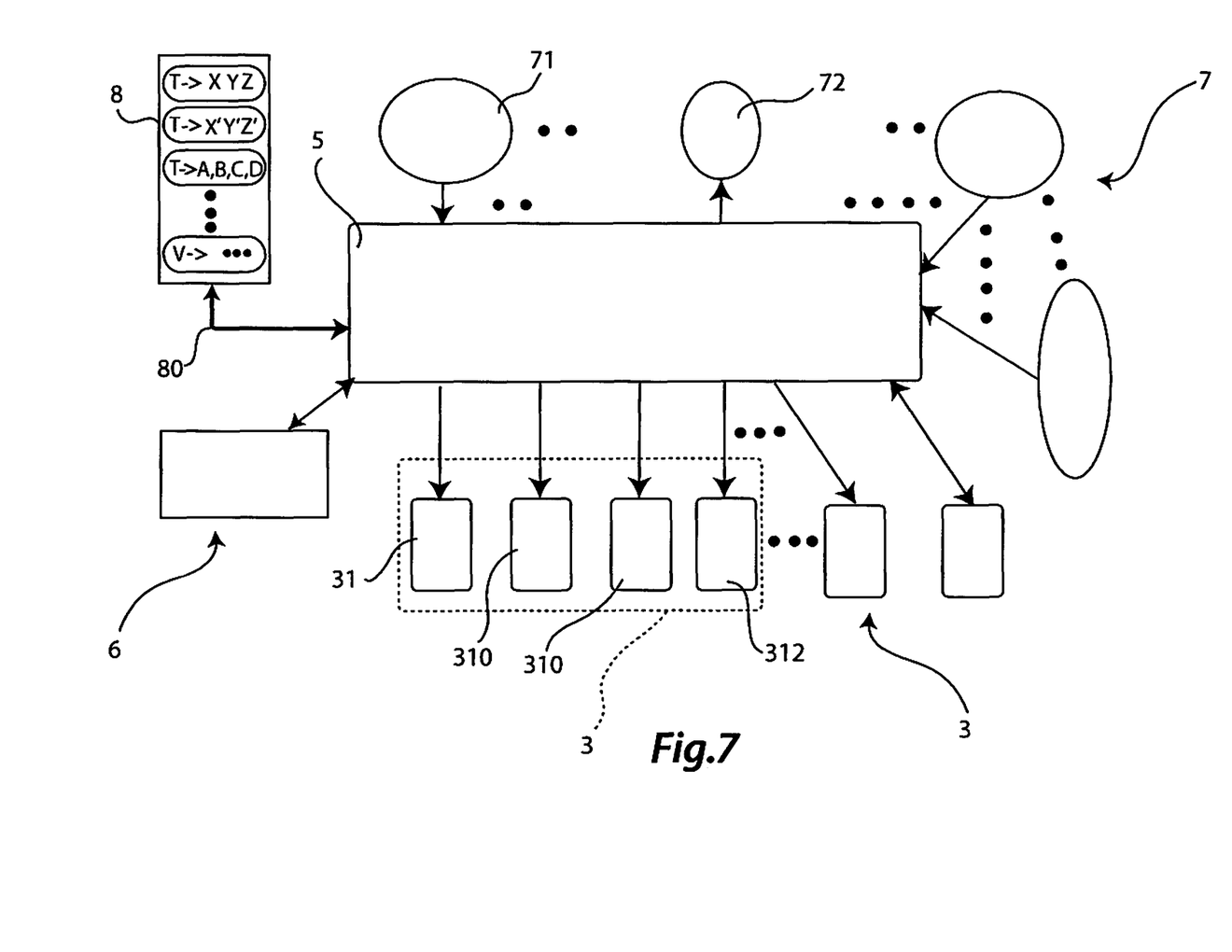
FIG. 7 is a block diagram of the control circuits comprised in the automated system according to the present invention.

Central control unit 5 performs continuous control with a double feedback loop and can control said plurality of sensors 7 and said plurality of actuation devices 3 through a data transfer network. A block diagram of the various interactions between central control unit 5 and the system of the present invention is shown, for example, in FIG. 7.

Depending on sections "T" to be joined, central control unit 5 can, thanks to the double feedback loop, find the optimal position of various sections "T" on the basis of actual data obtained from the plurality of sensors 7, of theoretical data associated with different sections "T", and of specified aerodynamic and mechanical tolerances.

Central control unit 5, e.g. implemented through a PLC, allows for coordinated movements of every actuation device 3 to obtain an optimal alignment between sections "T".

Said plurality of sensors 7 comprise at least one laser meter 71 adapted to measure, with high resolution and low uncertainty, the relative and absolute positions and distances of the various key points (A, B, C). The essential concepts upon which the operation of said laser meter 71 is based will not be described in detail herein because they are known to the man skilled in the art.

Each laser meter 71 is movably mounted on at least one carriage 72, which slides on at least one second guide 70, preferably arranged along said second axis "X". Said at least one carriage 72 is driven by a motor, preferably an electric one (not shown), controlled by said central control unit 5.

Said laser meter 71 is also fitted with a first actuator (not shown), which is adapted to move said laser meter 71 along axis "Z", and which is also controlled by said control unit 5.

Said laser meter 71 continuously takes a plurality of measurements in said key points, particularly in reference points "A" and check points "C". The data of such measurements continuously taken by laser meter 71 are transmitted, through a data transfer network 80, to said central control unit 5.

In the embodiment shown in FIGS. 1 and 2, the joining system comprises two laser meters 71, the second guides 70 of which are arranged in parallel along the second axis "X", between which there is at least one actuation device 3 adapted to move at least one section "T". In particular, between said second guides 70 there are three actuation devices 3, each comprising three columns 31.

Said plurality of sensors 7 comprise motion sensors adapted to measure the single movements of each actuation device 3, particularly of each column 31. In addition, said plurality of sensors 7 comprise electronic sensors adapted to detect the variation in the power absorbed by every single actuator of every single column 31, so as to detect the presence of sections "T" on the single actuation device 3. Such sensors also allow to determine if forces are being exerted by mistake on every single section by every single column 31, which might damage the single section "T" or the entire fuselage.

Each support 310 may comprise, e.g. in the area corresponding to support point 311, at least one load cell adapted to verify the presence of a section on actuation device 3, and possibly to evaluate the weight distribution on various columns 31.

Said plurality of sensors 7 further comprise temperature sensors, pressure sensors and humidity sensors, so as to take a picture of the environmental situation while making each junction between two or more sections. Such environmental data, measured through said sensors (not shown), allow to foresee, and hence to adequately compensate for, any intrinsic physical behaviour of each section "T" dependent on the actual environmental conditions.

Said central control unit 5 is connected, through said data transfer network 80, to at least one data storage unit 8, which is adapted to store, whether periodically or continuously, the data obtained from the single sections and from the junctions thereof, for each aircraft "V". Furthermore, central control unit 5 sends to said data storage unit 8 the number of sections "T" taken from the warehouse and the number of aircrafts manufactured, associating an identification code with each fuselage in order to ensure full traceability of the steps carried out for manufacturing the aircraft and the single components thereof.

The data stored in said at least one data storage unit 8 allow central control unit 5 to retrieve the data relating to said key points (A,B,C,D) for every single section "T", even after drilling single section "T" or prior to the shimming step, wherein shims are levelled for properly positioning the parts that make up the section or the aircraft itself.

Preferably, the following data are stored into said data storage unit 8:
- geometry of every single section "T", particularly the key points thereof;
- geometry of the fuselage after joining various sections "T";
- temperature, pressure and humidity of the environment;
- position of each support point 311 in space "XYZ" for every single column;

every movement made by each column 31 along each axis of movement;

reference system (X'Y'Z') created from the data obtained from the key points of every single section, for manufacturing each fuselage.

history of the alarms occurred during the steps of the joining method;

complete diagnostics of the devices included in the system;

sequence and times of execution of the joining method;

position and movements of each footboard of each platform.

The data are stored by using an appropriate compression encoding method, not shown in detail herein, in order to limit memory occupation.

The automated joining system according to the present invention further comprises electromechanical devices for the execution of some operations or steps for making the junction between two sections "T", e.g. at least one robotized arm for drilling and flaring the holes where riveting will take place on the parts concerned by the junction.

Figure 4:
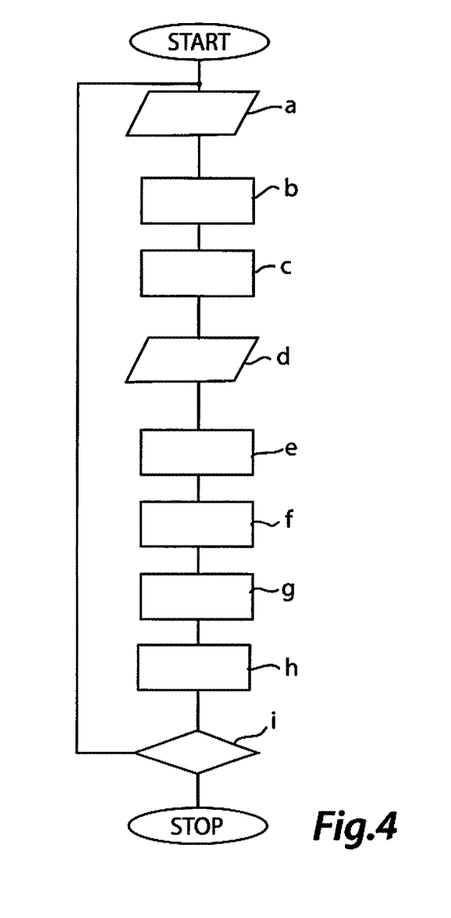
FIG. 4 shows a flow chart of one implementation of the joining method according to the present invention.

The method for automatically joining at least two portions in order to manufacture a chassis, controlled by a central control unit 5, comprises the following consecutive steps, as shown by way of example in the flow chart of FIG. 4:

a) Positioning a first portion on a first actuation device 3;

b) Detecting a plurality of key points (A,B,C) of said first portion, and sending the data to said central control unit (5);

c) Creating a reference system (X'Y'Z') starting from the data obtained at step b), as a function of the characteristics of said first portion;

d) Positioning a second portion on a second actuation device 3';

e) Detecting a plurality of key points (A,B,C) of said second portion, and sending the data to said central control unit 5;

f) Translating the data obtained at step e) into reference system (X'Y'Z') created at step c);

g) Bringing said first portion and said second portion near each other through said at least one actuation device (3, 3'), while continuously monitoring, through said plurality of sensors (7), the relative position of said plurality of key points (A,B,C) of each portion, as processed by said central control unit (5);

h) Joining the portions;

i) Repeating steps d)-h) for each additional portion of the chassis.

Preferably, said method is applicable for joining at least two sections "T" of a fuselage of an aircraft "V" by carrying out the following consecutive steps:

a) Positioning a first section "T" on a first actuation device 3;

b) Detecting a plurality of key points (A,B,C) of said first section "T", and sending the data to said central control unit (5);

c) Creating a reference system (X'Y'Z') starting from the data obtained at step b), as a function of the characteristics of said first section "T";

d) Positioning a second fuselage section "T" on a second actuation device 3';

e) Detecting a plurality of key points (A,B,C) of said second section "T", and sending the data to said central control unit 5;

f) Translating the data obtained at step e) into reference system (X'Y'Z') created at step c);

g) Bringing said first section "T" and said second section "T" near each other through said at least one actuation device (3, 3'), while continuously monitoring, through said plurality of sensors (7), the relative position of said plurality of key points (A,B,C) of each section (T, T'), as processed by said central control unit (5);

h) Joining the sections;

i) Repeating steps d)-h) for each additional section "T"" of the fuselage.

Preferably, the method according to the present invention further comprises the following steps:

Moving every single section to a predetermined height along axis "Z";

Moving the assembled fuselage;

Check carried out by an operator.

The following will describe in detail every step included in the method of the present invention, which is preferably implemented for manufacturing aircraft fuselages.

Prior to each step of positioning a section "T" on an actuation device, there is a step of moving mobile platform 62, wherein said mobile platform 62 is moved from a work configuration to an open configuration, thereby allowing section "T" to be moved towards actuation device 3. Once the positioning step has been completed, a further moving step is carried out, wherein said mobile platform 62 is moved from an open configuration to a work configuration.

After having executed step a) of positioning a first section "T" on a first actuation device 3, and after the moving step, a step b) of detecting a plurality of key points (A,B,C) is carried out. Said step b) is executed by said plurality of sensors 7, which measure and determine reference points "A", lift points "B", and check points "C" as previously described. Such data are sent to said central control unit 5. Preferably, said central control unit 5 sends the data relating to said key points (A,B,C) received from the plurality of sensors 7, through said data transfer network 80, to said data storage unit 8, wherein such data are stored and univocally associated with said first section "T". The data relating to any one section "T", e.g. the first section "T", may be taken from said data storage unit 8 at any time, e.g. by central control unit 5 or by a remote computer connected to data transmission network 80. Preferably, each datum contained in the data storage unit may be requested for further processing by central control unit 5.

Before proceeding with the next steps of the method according to the present invention, the data associated with every single section are compared with the theoretical data of the design drawings, which have also been stored, for example, into the same data storage unit 8. Central control unit 5 verifies if the data associated with section "T" are compliant with the theoretical data about the specified design tolerances, by performing a last step of checking each section, preferably before the same section is positioned in the automated joining system according to the present invention.

This check may also be useful to determine which section "T" is about to enter the automated joining system, prior to carrying out the above moving step, for the purpose of identifying actuation device 3 with which it must be associated, and for determining and organizing the handling of said section "T" in order to position it inside the system.

In the next step c) of creating a reference system (X'Y'Z'), said reference system may be absolute with respect to space (XYZ) where the automated assembly system is located, as well as relative with respect to said first section "T", already appropriately positioned in the joining system in accordance with the present invention.

Reference system (X'Y'Z') will be determined as a function of the number of columns 31 included in actuation device 3 associated with said first section. In the specific case with three columns 31, reference system (X'Y'Z') will be defined by nine spatial coordinates, i.e. three per column 31. Once said reference system (X'Y'Z') has been defined, it will be impossible to modify said reference system until the steps of the method according to the present invention have been completed, in particular until the sections have been joined and the entire fuselage has been assembled. Determining a reference system (X'Y'Z') is useful to simplify the processing that must be carried out by central control unit 5 in order to issue proper handling commands to single actuation devices 3.

After step c) and prior to step d), there is preferably a further step of moving section "T" to a predetermined height "Z'".

Subsequently, at step d), a second section "T'" is positioned on a second actuation device 3', which step is substantially similar to the above-mentioned step a). In particular, it will include the steps of moving the mobile platform.

Step d) is followed by the detection step e). This detection step e) is substantially similar to the previously described step b), and therefore will not be further described.

The data obtained in said step e) are used in the next step f) of translating the obtained data into reference system (X'Y'Z'). During this step, the data relating to said second section "T'" are processed in such a way as to be expressed with respect to reference system (X'Y'Z'), for the purpose of conforming the data of every single section to said reference system.

Preferably, said step f) is followed by a further step of moving section "T'" to a predetermined height "Z'".

A further step f1) of first alignment is then carried out, wherein said second section "T'" is moved, through respective actuation device 3', in a manner such that said key points (A, B, C) of the second section "T'" become substantially aligned with the corresponding key points of the first section "T" with respect to reference system (X'Y'Z'). For the purposes of the present invention, the expression "substantially aligned" means that the key points useful for joining the two sections are aligned, within the limits of allowable tolerances, along axes parallel to one axis of the reference system (X'Y'Z').

Said alignment is possible thanks to the plurality of columns 31 of each actuation device, in particular thanks to support or arm 310 and to support point 311, which allow to move every single section with at least three degrees of freedom in an automatic, coordinated and synchronized manner. Furthermore, said alignment is made possible by the continuous detection made by the plurality of sensors 7 on the single sections. Said step f1) of first alignment is integrally controlled and managed by central control unit 5, which implements an algorithm, stored in a non-volatile memory medium, which, based on the data obtained from the key points continuously measured by said plurality of sensors 7, determines the correction to be made to the section position in order to attain a better alignment, within the limits of the allowable tolerances. The data thus processed are transformed into commands to be sent to single actuation devices.

Figure 5A:
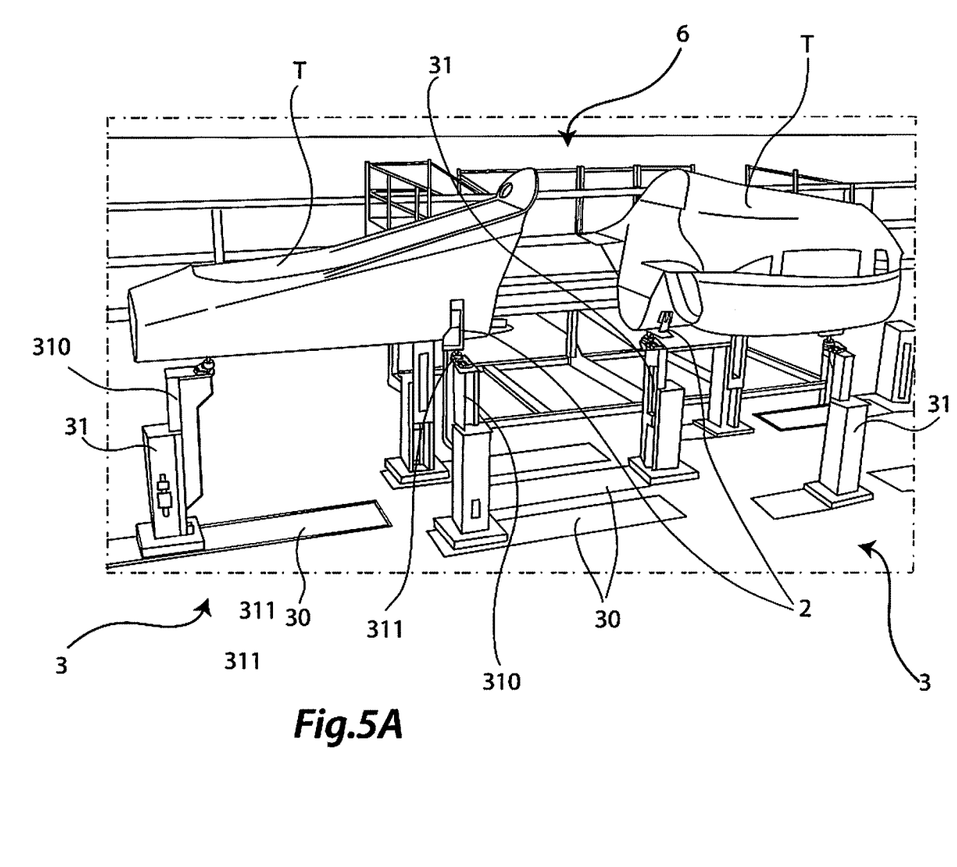

This leads to step g) of bringing the sections near each other by means of said actuation devices 3, as shown in FIG. 5A, in particular through columns 31, which can be moved in a coordinated and synchronized manner along said second axis "X" on said first guides 30. During this moving step, a detection step is simultaneously and continuously carried out, which allows control unit 5 to send appropriate commands to the single actuation devices depending on the data processed by said algorithm. Preferably, said algorithm implements a solution with successive approximations to determine the optimal alignment between the sections. Said algorithm also comprises calculation functions that appropriately take into account the thermal expansions, torsions, etc. that every single section may be subject to during the moving steps and because of the physical conditions, such as humidity, temperature, etc., of the place where the joining process is being carried out.

Figure 5B:
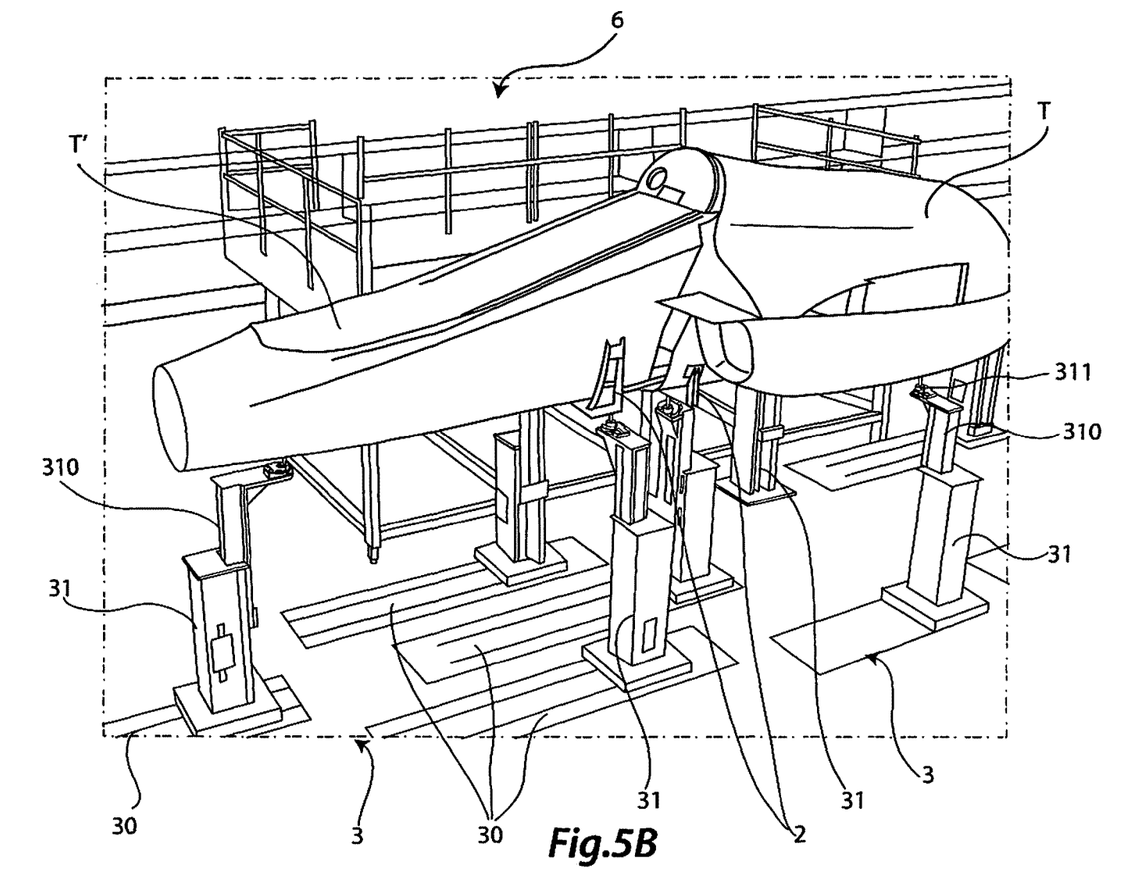

The aligning step g) is then followed by the joining step h), illustrated in FIG. 5B. During this joining step h), two or more sections "T" are joined together.

Additional steps are executed after step h), during which the following consecutive operations are carried out:
 drilling both sections;
 flaring the holes;
 riveting the sections.

These operations, preferably following the joining step h), may be either carried out manually by an operator or automatically, whether totally or partially, by means of, for example, electromechanical devices controlled by said central control unit 5.

Depending on the data processed by said algorithm, control unit 5 will send handling instructions to every single column, so as to correct any alignment errors.

The data processed by the algorithm and the resulting actions carried out on the single sections are suitably stored into said data storage unit 8. Said stored data may allow control unit 5, through a machine-learning process to be carried out after steps b) and e) have been completed for each section, to determine if, in the history of the junctions made by the automated joining system, contained in the data storage unit, two sections substantially similar to those currently under examination have already been joined, and to use such information for properly handling every single section. Said machine-learning process may allow to speed up the aircraft production process, avoiding the need for recalculating each time the best alignment by means of said algorithm. Preferably, supplementary checks are made in order to perform an additional quality check on every single junction. In particular, said checks are carried out by control unit 5 in order to verify if the data obtained from data storage unit 8 about previously made junctions are actually applicable, step by step, for making the current junction.

This process allows making the assembly method highly repeatable with optimal results, while at the same time ensuring reduced fuselage production times.

The handling of single section "T" may be either synchronized with the other sections "T" or independent thereof, depending on specific requirements and on the step of the method being executed. For example, a given section "T" may be moved independently of the remaining sections in order to allow the operator to verify some construction parameters of that single section, if necessary.

In an alternative embodiment, by means of suitable systems for transferring data, e.g. time-multiplexed ones, from the sensors, from actuation devices 3, and from/to central control unit 5, the method according to the present invention allows to execute the steps f1)-h) in parallel for joining multiple sections "T" in a substantially simultaneous manner.

For the purposes of the present invention, the expression "substantially simultaneous junctions" means that the steps f1)-h), thanks to the computing and processing speed of control unit 5 and to the high data transfer speed, the data being appropriately modulated, can be executed in parallel for joining multiple sections, cyclically over time.

Preferably, each section "T" is placed at such a height as to allow an operator, from the at least one platform 6, to reach every point of the fuselage section through said footboards 60.

After each step of moving one or more sections "T", there is at least one step of detecting a plurality of key points (A,B,C) of said first portion, which are then sent to said central control unit 5.

Figure 6:
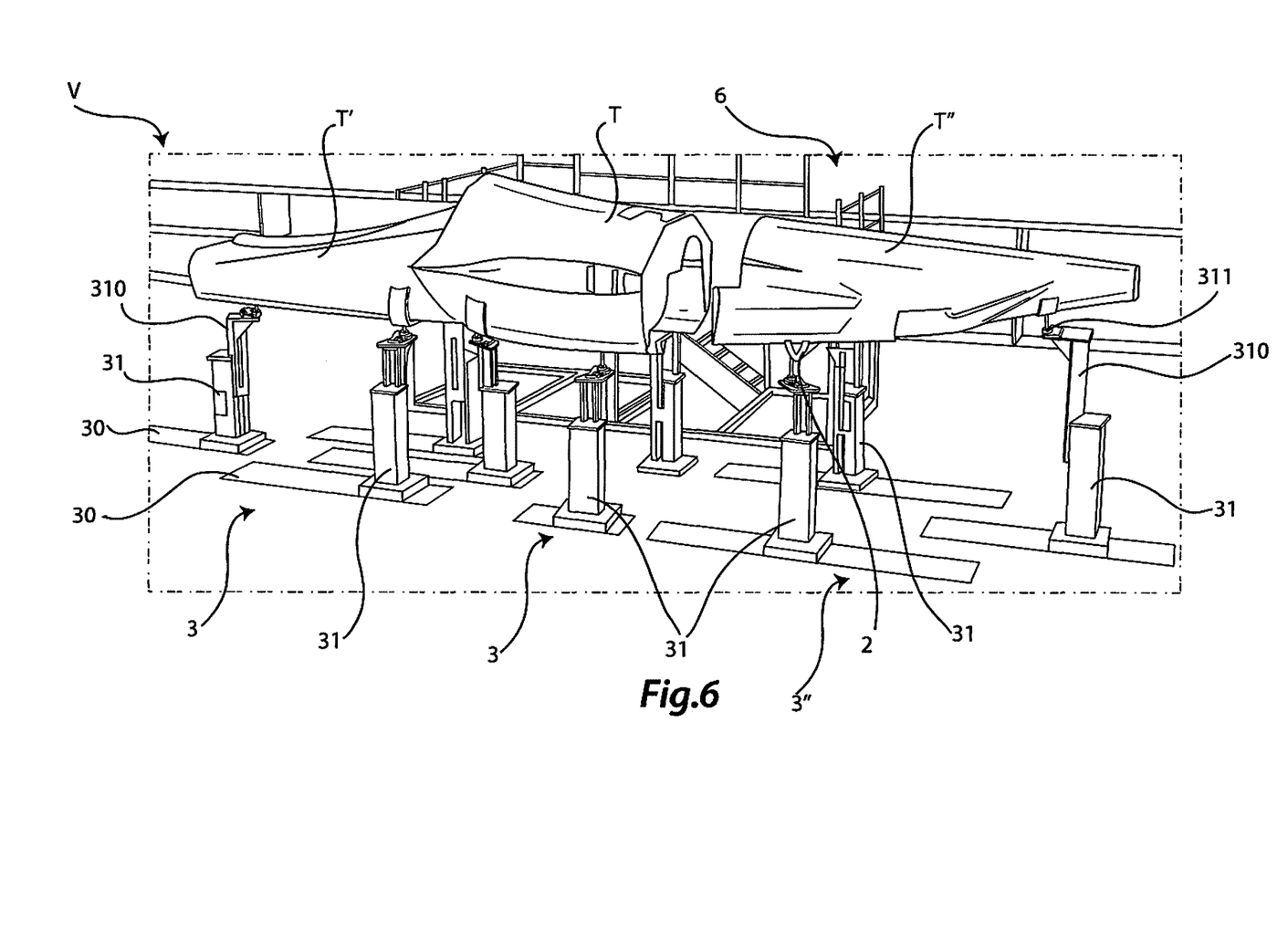
FIG. 6 is a perspective view showing the positioning of a third section for assembling a fuselage by applying the joining method according to the present invention.

The sequence of steps d)-g) is carried out for each additional section "T''" to be connected to the already assembled sections in order to manufacture the complete fuselage, as shown in FIG. 6.

After all sections "T" have been joined, there is an additional step of moving the assembled fuselage.

A final check step is then carried out by an operator, in order to verify the obtained results. If the junction between the sections is fully compliant with the design specifications and within the tolerances assigned to a single fuselage, an identification code will be assigned, also associated with the key points, so that all the phases of production of the aircraft can be traced.

Preferably, switching from one step of the above method to the next only occurs upon authorization by the operator in charge, who at the end of each step may, if necessary, verify the obtained data and check the progress of the method. After a system running-in phase, wherein all the necessary data are stored into the data storage unit, thanks to the machine-learning process it may be possible to totally automate the joining method by allowing control unit 5 to switch from one system step to another without waiting for the operator's authorization.

The system, and hence the associated method, only requires one operator to supervise it in order to monitor the implementation of the method, allowing the method steps to proceed without having to verify the data obtained from the system itself, and intervening only in the event of gross errors or technical problems caused by human mistakes.

The automated joining system and the associated method are applicable for joining portions of any chassis, whether in the aviation industry, as described herein, or in the naval industry, for manufacturing boats, or for making devices of any kind, thus considerably enhancing the production speed and repeatability of the joining process.

The presence of a single central control device 5 allows coordinating innumerable devices in order to obtain an automated process, thus reducing the assembly uncertainty due to the human component.

| REFERENCE NUMERALS | | | |
|---|---|---|---|
| 2 | Scaffold or base | | |
| 3 | Actuation device | | |
| 30 | First guides | | |
| 31 | Column  31' Outer column  31" Third column | | |
| 310 | Support or arm | | |
| 311 | Support point or hemisphere | | |
| 312 | Retaining element | | |
| 5 | Central control unit | | |
| 7 | Plurality of sensors | | |
| 70 | Second guides | | |
| 71 | Laser meter | 72 | Carriage |
| 6 | Platform | 60 | Footboards |
| 61 | Fixed platform | 611 | Control station |
| 62 | Mobile platform | | |
| 8 | Data storage unit | | |
| 80 | Data transfer network | | |

| REFERENCE NUMERALS | |
|---|---|
| T | Sections |
| V | Aircraft |
| (A, B, C) | Key points |
| A | Reference points |
| B | Lift points |
| C | Check points |
| D | Point |
| XYZ | Space |
| Y | First axis |
| X | Second axis |
| Z | Vertical axis |
| X' Y' Z' | Reference system |

The invention claimed is:

1. Automated system for joining at least two portions of a chassis, comprising:
at least one actuation device adapted to move at least one portion of said at least two portions in a space with three degrees of freedom;
a central control unit for controlling each of said at least one actuation device as a function of a plurality of data obtained through a plurality of sensors;
wherein said plurality of sensors are configured to continuously determine, on each chassis portion, a plurality of key points which are univocal for each of said at least two portions;
said central control unit, depending on the data obtained from said plurality of sensors, activates said at least one actuation device in order to bring near and connect said at least two portions, while monitoring, through said plurality of sensors, the relative position between said plurality of key points of said portions and the absolute position of said portions in the space;
said system is adapted to join at least two sections of a fuselage of an aircraft;
each actuation device comprises at least one column for supporting and moving at least one section, comprising at least one support or arm for moving said section with three degrees of freedom;
said at least one column can be extended, in an automatic manner, along a vertical axis and can move on adapted first guides along a second axis, perpendicular to said vertical axis;
said plurality of sensors comprise at least one laser meter for continuously measuring position of the key points and relative and absolute distances of the key points;
wherein each laser meter is movable, each laser meter being associated with at least one carriage;
each carriage sliding on at least one second guide, said at least one second guide being arranged along a second axis; movement of said carriage being controlled by said central unit.

2. The system according to claim 1, wherein said key points are divided into:
reference points, which represent section reference points for the relative alignment between the sections;
lift points, where a scaffold or base is secured to the section;
check points, which identify proper position of the section for the joining process.

3. The system according to claim 1, wherein said central control unit performs continuous control with a double feedback loop and, through a data transfer network, can control said plurality of sensors and said at least one actuation device.

4. The system according to claim 3, wherein said central control unit is connected, through said data transfer network, to a data storage unit, for storing the data obtained during the steps of joining the various portions making up the chassis.

5. The system according to claim 1, wherein said plurality of sensors comprises temperature sensors, pressure sensors and humidity sensors, adapted to take a picture of the environmental situation while making each junction between two or more sections.

6. The system according to claim 5, wherein said central control unit implementing an algorithm, stored in a non-volatile memory medium, which, based on data obtained from a plurality of key points continuously measured by said plurality of sensors, is able to determine the correction to be made to a section position in order to attain a better alignment, within limits of allowable tolerances; wherein said data processed are transformed into commands to be sent to single actuation devices.

7. The system according to claim 1, wherein said central control unit implementing an algorithm, stored in a non-volatile memory medium, which, based on data obtained from a plurality of key points continuously measured by said plurality of sensors, is able to determine the correction to be made to a section position in order to attain a better alignment, within limits of allowable tolerances; wherein said data processed are transformed into commands to be sent to single actuation devices.

8. The system according to claim 7, wherein said control unit sending appropriate commands to the single actuation devices depending on the data processed by said algorithm;
    said algorithm implementing a solution with successive approximations to determine the optimal alignment between the sections;
    said algorithm comprising calculation functions, said calculation functions appropriately taking into account thermal expansions and/or torsions that every single section may be subject to during moving steps and because of the physical conditions, including humidity and/or temperature, etc. of a place where joining is being carried out.

* * * * *